Feb. 22, 1927.
F. E. OWEN
SCREW DOWN VALVE
Filed Nov. 12, 1925
1,618,844
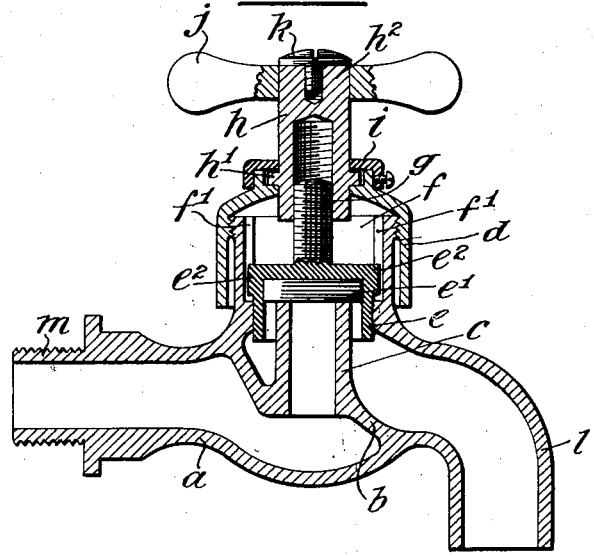
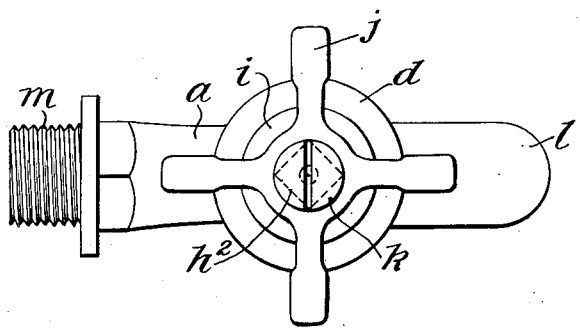
Inventor.
Francis Ernest Owen
by Connolly Bros
Attys Patented Feb. 22, 1927.

1,618,844

UNITED STATES PATENT OFFICE.

FRANCIS ERNEST OWEN, OF ROMFORD, ENGLAND.

SCREW-DOWN VALVE.

Application filed November 12, 1925, Serial No. 68,570, and in Great Britain January 10, 1925.

This invention relates to water and like valves or taps of the screw-down type and has for its object to provide an improved construction which shall be more efficient in action and less liable to leakage than constructions hitherto known, and equally suitable for controlling hot and cold water supplies.

The improved valve forming the subject matter of this invention comprises a cup shaped valve member which embraces and co-acts with a seating of tubular form projecting from a partition web separating the interior of the valve body or casing into inlet and outlet spaces. This valve member is arranged to slide without rotating in the body and carries a screw-threaded shank which is engaged by an internally screw-threaded hollow spindle projecting to the exterior of the valve body. This spindle carries an operating handle or thumb-piece and is formed with an annular flange making a fluid tight joint with a gland in the cover of the valve body.

As will readily be understood in turning the operating spindle the valve will be caused either to rise or fall in the valve body and so bring about the opening or closing of the valve as desired. The outlet from the valve is made of larger bore than the inlet in order that the water may have a free discharge passage and owing to the siphonic action set up by the discharging water the actual pressure existing above the valve member is considerably reduced and in consequence the tendency for water to leak past the operating spindle is eliminated or considerably minimized.

The invention is hereinafter more fully disclosed with reference to the accompanying drawing wherein:—

Figure 1 is a vertical sectional view of a preferred form of screw-down water tap constructed in accordance with my invention and Figure 2 is a plan view of the same.

The improved construction of water tap shown is suitable for use in connection with domestic and like water supplies and comprises a body or casing $a$ formed with the usual partition web $b$ from which a seating $c$ of tubular form projects in the direction of the cover $d$. The valve member $e$ for co-operation with this seating $c$ resembles in shape an inverted cup and its internal diameter exceeds the external diameter of the upper part of the seating, so that an annular space exists between these surfaces. A washer $e'$ is contained in the valve member for contact with the seating.

The valve member is guided for vertical movement in a chamber $f$ in the upper part of the valve body and is prevented from rotating therein by lugs $e^2$, $e^2$ engaging longitudinal grooves $f'$ in the walls of the chamber. A screw-threaded stem $g$ projecting axially from the valve member in an upward direction engages with the internally screw-threaded hollow portion of an operating spindle $h$ which when rotated operates to lift or depress the valve member. This spindle $h$ is formed externally with an annular flange $h'$ which is engaged within a stuffing box $i$ provided at the upper part of the cover and is formed at its upper end with a squared shank $h^2$ engaged in a corresponding hole in the central boss of a handle $j$ which may have four wings as in Figure 2 or two wings or be of any other suitable pattern. A screw $k$ entering a hole in the upper end of the spindle $h$ has a wide head securing the handle in place. If desired such screws may be provided with a name tablet to indicate the nature of the service to which the tap is applied.

The cover is in the shape of an inverted cup, the cylindrical wall of which forms a skirt surrounding the wall of the chamber $f$. This cover is internally screw-threaded at its upper end to engage with screw threads on the outside of the chamber $f$. The skirt of the cover conceals the joint between the cover and the valve body, and forms a convenient means for manually unscrewing the cover from and on the valve body, and for guiding the parts into proper relative position and adds finish to the valve.

The outlet $l$ from the valve which communicates with the upper side of the partition web $b$ is of larger bore than the inlet $m$ in order that the water may have a free discharge passage and set up a siphonic action tending to reduce the pressure existing above the valve member and to minimize the tendency of water to leak past the operating spindle.

I claim:—

A water faucet comprising a body with a transverse partition separating the inlet and outlet spaces, a tubular seating upstanding from said partition, a cylindrical upward extension of said body, externally screw-threaded at its upper end, a cylindrical cup shaped valve co-operating with said seating and having an externally threaded stem, a spindle for operating said valve, formed with a threaded socket for the reception of said stem, and with an external annular flange, a screw threaded cover for said cylindrical extension, said cover comprising a skirt having screw threads at its upper end co-operating with threads on said cylindrical extension, an annular boss rising from said cover and a flange cap surmounting said boss, and forming therewith a stuffing box embracing the external flange of said spindle.

In testimony whereof he has affixed his signature.

FRANCIS ERNEST OWEN.